3,048,593
17-SUBSTITUTED YOHIMBENES AND
PROCESS THEREFOR
John Shavel, Jr., Mendham, and George Bobowski, East
Orange, N.J., assignors to Warner-Lambert Pharmaceutical Company, Morris Plains, N.J., a corporation of Delaware
No Drawing. Filed June 15, 1960, Ser. No. 36,129
5 Claims. (Cl. 260—288)

The present invention relates to new and novel 17-substituted yohimbenes of the formula:

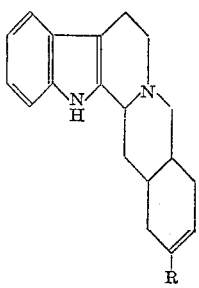

wherein R is an alkyl group of the formula $C_nH_{2n+1}$ where $n$ is 1 to 18, an alkenyl group of the formula $C_mH_{2m-1}$ or an alkynyl group of the formula $C_mH_{2m-3}$ where $m$ is 2 to 18, a cycloalkyl group having 5 to 7 carbon atoms or aryl and aralkyl groups either unsubstituted or substituted with one or more lower alkyl, lower alkoxy, halogen, phenyl or di-lower alkylamino groups. The pharmaceutically acceptable non-toxic acid addition and quaternary ammonium salts of these compounds are also included within the scope of this invention. The invention further relates to methods of producing these compounds.

The new and novel 17-yohimbenes of this invention have interesting pharmacological activity, being particularly useful as tranquilizers, analgesics and hypotensive agents. They are also valuable intermediates in the preparation of other active compounds of the yohimbane series by virtue of the reactive double bond between the carbon atoms at the 17 and 18 positions. This double bond may be reduced or reacted with such materials as halogens, halogen acids, sulfuric acid or hydroxylating agents such as hydrogen peroxide, osmium tetroxide and the like.

As used throughout the specification and in the claims, the terms "lower alkyl" and "lower alkoxy" refer to straight and branched chain aliphatic groups having 1 to 6 carbon atoms.

Among the compounds included within the scope of and encompassed by this invention are 17-phenyl-17-yohimbene, 17-(α-naphthyl)-17-yohimbene, 17-(β-naphthyl)-17-yohimbene, 17-methyl-17-yohimbene, 17-ethyl-17-yohimbene, 17 - amyl - 17 - yohimbene, 17-dodecyl-17-yohimbene, 17-stearyl-17-yohimbene, 17-vinyl-17-yohimbene, 17-allyl-17-yohimbene, 17-ethynyl-17-yohimbene, 17-decylethynyl-17-yohimbene, 17-cyclopentyl-17-yohimbene, 17-cyclohexyl-17-yohimbene, 17-cycloheptyl-17-yohimbene, 17-benzyl-17-yohimbene, 17-phenylethyl-17-yohimbene, 17-biphenylyl-17-yohimbene, 17-(p-methoxyphenyl) - 17 - yohimbene, 17-(p-fluorophenyl)-17-yohimbene, 17-(p-chlorophenyl)-17-yohimbene, 17-o-totyl)-17-yohimbene, 17-(p-tolyl)-17-yohimbene, 17-(p-methoxyphenyl)-17-yohimbene, 17 - (p-butoxyphenyl)-17-yohimbene, 17-(p-diethylaminophenyl)-17-yohimbene, 17-(p-dimethylaminophenyl)-17-yohimbene, 17-(p-chlorobenzyl)-17-yohimbene, and the like.

In our application entitled "Yohimbane Derivatives and Process Therefor" filed concurrently herewith, we have described the preparation of certain yohimbane derivatives having the formula:

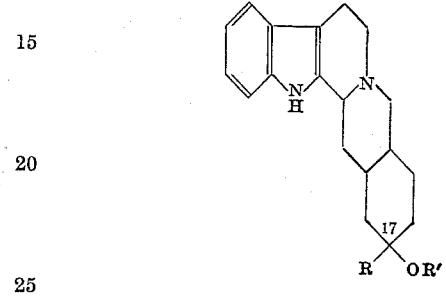

where R is as described above and R' is hydrogen or an acyl radical of an alkyl or aryl carboxylic or sulfonic acid. Compounds of the above formula where R' is hydrogen are produced by the reaction of yohimbone (B. Witkop, Ann. 554, pg. 83 (1943)) with a Grignard reagent of the formula RMgX, where X is chlorine, bromine or iodine, or with an organometal complex of the formula RM, where M is lithium, potassium or sodium. Since these yohimbone derivatives have an asymmetric carbon atom at the 17-position they exist as epimers (one positively rotating and the other negatively rotating) which may be separated by chromatography and by fractional crystallization from organic solvents.

It has now been found that it is posible to isolate 17-yohimbenes of the formula:

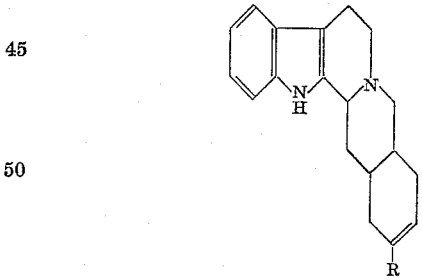

from the non-crystallizable mother liquors obtained in recovering the 17-yohimbols described in our copending application, filed concurrently herewith, from their reaction mixtures. Treatment of these non-crystallizable mother liquors with hydrogen chloride results in dehydration of an appreciable portion of the 17-yohimbols dissolved therein to form the corresponding 17-yohimbenes. Alternately, passing the mother liquor through acid-washed alumina results in formation of 17-yohimbenes due to dehydration catalyzed by the alumina. The 17-yohimbenes are then recovered by repeated recrystallizations from such solvents as chloroform, methylene chloride and the like.

It has also been found that the new and novel 17-yohimbenes of this invention may be prepared by the dehydration of 17-substituted yohimbols by the following reaction:

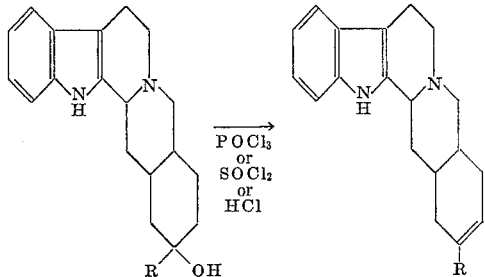

The dehydration reaction is carried out in a suitable inert solvent, that is a material in which the 17-substituted yohimbol is soluble but which does not react with either the 17-substituted yohimbol, the 17-yohimbene produced therefrom or the dehydration agent. Anhydrous pyridine is a preferred solvent when phosphorous oxycloride or thionyl chloride is used whereas anhydrous ethanol is preferred when hydrogen chloride is used in the dehydration reaction.

When phosphorous oxychloride or thionyl chloride is used as the dehydration agent, the reaction is carried out at temperatures between about 20° C. and about 70° C. At the higher temperature, 15 minutes to 1 hour is the normal reaction time, whereas at the lower temperature, up to about 24 hours is required. Although longer reaction times are required at lower reaction temperatures, such conditions are preferable in that higher yields are obtained as a result of reduced decomposition of the materials in the reaction mixture. At the conclusion of the reaction, the mixture is processed for recovery of the 17-yohimbene derivative by various techniques of extraction and crystallization. For example, the solution may be treated with a large volume of ether and then filtered. The solids are then made alkaline, extracted with chloroform and the extract evaporated to dryness. Trituration with such solvents as acetonitrile, methanol and the like followed by recrystallization from such solvents as methanol or ethanol yields the desired product in pure form. Alternately, the solution is poured onto ice and the precipitate separated by filtration. The precipitate is then treated with base and extracted and purified as described above.

When hydrogen chloride is used as the dehydration agent, the reaction mixture is refluxed for several hours and then processed for recovery of the 17-yohimbene derivative. Such recovery may be effected by evaporation of the solvent, treating the residue with base and extracting with a solvent such as chloroform. Evaporation of the extract and trituration of the residue with such solvents as acetonitrile, methanol and the like yields the desired 17-yohimbene derivative at yields of up to 50 percent. It has been found that the same 17-substituted yohimbene product is obtained regardless of the optical configuration at the 17-position of the starting material.

The 17-yohimbenes may be converted into their pharmaceutically acceptable non-toxic acid addition or quaternary ammonium salts. Exemplary of non-toxic acid addition salts are those formed with maleic, fumaric, benzoic, ascorbic, succinic, bismethylenesalicylic, methylsulfonic, ethanedisulfonic, acetic, propionic, tartaric, salicylic, citric, gluconic, lactic, malic, mandelic, cinnamic, citraconic, stearic, palmitic, itaconic, glycolic, benzenesulfonic, hydrochloric, hydrobromic, sulfuric, sulfamic, phosphoric and nitric acids. The acid addition salts may be prepared in the conventional manner, for example, by treating a solution or suspension of the free base in an organic solvent with the desired acid, and then recovering the salt which forms by crystallization techniques. The quaternary salts are prepared by heating a suspension or solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositiories and the like. Each dosage form will normally contain about 5 to about 50 milligrams of active ingredient.

The following examples are included in order further to illustrate the present invention:

EXAMPLE 1

A solution of 10 g. of yohimbone in 800 ml. of dry tetrahydrofuran (distilled from LiAlH$_4$) is added at −30° C. to 0.13 mol of phenyl magnesium bromide in ether over one hour with vigorous stirring. A fine stream of nitrogen is passed through the system during the addition. The subsequent ionophoresis (700 v./2 ma./5 N. acetic acid/one hour) of the reaction mixture showed complete reaction. (Relative mobility in respect to yohimbone 0.85.) A solution of 15 g. of ammonium chloride in 100 ml. of water is added at −30 to 0° C. and stirred for forty minutes. The two layers are separated and the aqueous phase extracted twice with 100 ml. of ethyl acetate. The combined organic extracts are dried over sodium sulfate and the solvent removed in vacuo. The resulted semi-solid residue is refluxed with 150 ml. of petroleum ether (B.P. 30–75° C.) to remove residual bromo benzene and biphenyl. After cooling the mixture is filtered and the filtrate, containing only traces of phenyl-yohimbols, is discarded. The residue weighs 13.0 g. and is crude 17-phenylyohimbol [$\alpha$]$_D^{25}$=±0.0°, c.=.400, l.=1 dm., chloroform.

The crude product, constituting a mixture of the two epimers (about 50/50) is slurried on a magnetic stirrer with 90 ml. of chloroform at 35° C. for four hours. After cooling, the homogeneous mush is filtered, giving 3.5 g. of material, M.P. 245–255° C., [$\alpha$]$_D^{25}$=+64°, c.=.45, l.=1 dm., chloroform. Concentration of the mother liquor to about 50 ml. and cooling yields 4.1 g. of white crystals, M.P. 270–272° C., [$\alpha$]$_D^{25}$=−53°, c.=.75, l.=1 dm., chloroform. After evaporation of the mother liquor to dryness and trituration with 15 ml. of methanol-acetonitrile (1:1), a third crop of material weighing 0.9 g. is obtained, [$\alpha$]$_D^{25}$=+57°, c.=.500, l.=1 dm., chloroform. Further concentration of the mother liquor to about 8 ml. and cooling gives an additional 0.2 g. of tan colored crystals, [$\alpha$]$_D^{25}$=−27°, c.=.45, l.=1 dm., chloroform. The total yield constitutes 72.5 percent of theory of 17-phenylyohimbol.

The positively-rotating fractions [$\alpha$]$_D^{25}$=+64° and +57°, chloroform (3.5 g. and 0.9 g., respectively), are slurried with 45 ml. of methanol on a magnetic stirrer for five hours at 35° C. After cooling and filtration, 2.8 g. of white-tan colored crystals of the positively-rotating epimer of 17-phenylyohimbol are obtained, M.P. 255–262° C., [$\alpha$]$_D^{25}$=+74°, c.=.55, l.=1 dm., chloroform.

To a solution of 1.5 g. of the positively-rotating epimer of 17-phenylyohimbol in 12 ml. of dry pyridine is added dropwise 3 ml. of phosphorous oxychloride at 0° C., followed by stirring for thirty minutes. Then, the reddish solution is heated at 60–70° C. for one hour. After cooling to 0° C., 120 ml. of ether are added, and the solid is filtered off. The filtrate is discarded, and the solid is treated with ammonia and then with 20% aqueous sodium hydroxide solution, and extracted with chloroform. Evaporation of the solvent in vacuo and trituration with acetonitrile gives the off-white crystals, M.P. 218–223° C. Recrystallization from methanol gives pure 17-phenyl-17-yohimbene, M.P. 223–226° C., $[\alpha]_D^{25}=-125°$, c.=1.45, l.=1 dm., chloroform.

*Analysis.*—Calc. $C_{25}H_{26}N_2$: C, 84.70; H, 7.39; N, 7.90. Found: C, 84.62; H, 7.65; N, 7.85.

EXAMPLE 1A

To a solution of 1.0 g. of the positively-rotating epimer of 17-phenylyohimbol obtained in Example 1 in 80 ml. of hot absolute ethanol is added 10 ml. of saturated ethanolic hydrogen chloride and the clear solution is refluxed for five hours. Paper chromatography (heptane/benzene/actone, 1:1:1 in $NH_3$ atmosphere) shows complete dehydration. The solvent is removed in vacuo, the residue made alkaline with ammonia, and then extracted with 50 ml. of chloroform. The extract is dried over sodium sulfate and the solvent removed in vacuo. The residue is triturated with 5 ml. hot methanol. Cooling and filtration gives 0.6 g. of pinkish-colored crystals of 17-phenyl-17-yohimbene, M.P. 210–216° C., $[\alpha]_D^{25}=-121°$, c.=0.60, l.=1 dm., chloroform.

EXAMPLE 2

The negatively-rotating fractions obtained in Example 1, $[\alpha]_D^{25}=-53°$ and $-29°$, chloroform (4.1 g. and 0.2 g., respectively), are dissolved in 160 ml. of hot chloroform and concentrated to about 70 ml. Upon cooling of this solution, 1.6 grams of the negatively-rotating epimer of 17-phenylyohimbol are obtained as white crystals.

A quantity of 1.5 grams of this material is dissolved in 20 ml. of dry pyridine and to this solution is added dropwise 6 ml. of phosphorous oxychloride at 0° C. over 15 minutes. The mixture is then heated for one hour at 60° C. and allowed to cool to room temperature. After the addition of 60 ml. of ether with stirring the mixture is cooled and filtered. The solid is treated with 10 ml. of 10% sodium hydroxide in 50 ml. of chloroform. The chloroform layer is dried over sodium sulfate and the solvent removed in vacuo. Trituration with 15 ml. of methanol yields 1.35 g. of pinkish colored crystals, M.P. 216–221° C., $[\alpha]_D^{25}=111°$, c.=.775, l.=1 dm., chloroform. Recrystalllization of this material from methanol gives off-white crystals of 17-phenyl-17-yohimbene, M.P. 221–225° C., $[\alpha]_D^{25}=-124°$, c.=1.14, l.=1 dm., chloroform.

A mixed melting point with the 17-phenyl-17-yohimbene obtained in Example 1 shows no depression.

EXAMPLE 3

To a solution of 1.0 g. of the positively-rotating epimer of 17-phenylyohimbol obtained in Example 1 in 15 ml. of dry pyridine is added 0.5 ml. of thionyl chloride in 5 ml. of pyridine dropwise at 0° C. After one hour, 80 ml. of ether are added and the mixture is stirred and filtered. The filtrate is discarded and the solid is treated with 10 ml. of 10% sodium hydroxide in 30 ml. of chloroform. The chloroform extract is dried over sodium sulfate and the solvent removed in vacuo. Trituration with 10 ml. of methanol gives 0.3 g. of pinkish colored crystals, M.P. 216–225° C., $[\alpha]_D^{25}=-125°$, c.=.880, l.=1 dm., chloroform. Recrystallization from methanol gives pure 17-phenyl-17-yohimbene, M.P. 223–226° C., $[\alpha]_D^{25}=-126°$, c.=.880, l.=1 dm., chloroform.

*Analysis.*—Calc. $C_{25}H_{26}N_2$: C, 84.70; H, 7.39; N, 7.90. Found: C, 84.54; H, 7.46; N, 7.93.

EXAMPLE 4

17-(p-Chlorophenyl)-17-Yohimbene

A solution of 35 g. of yohimbone in 2.3 liter of dry tetrahydrofuran (distilled from $LiAlH_4$) is added to 600 ml. of 0.9 N ethereal p-chlorophenyl magnesium bromide with stirring at 0° C. over a period of two hours. After one-half hour, a solution of 50 g. of ammonium chloride in 500 ml. of water is added and the mixture is stirred for ninety minutes. The two liquid phases are separated and the aqueous phase extracted twice with 100 ml. of chloroform. The combined organic extracts are dried over sodium sulfate and the solvent removed in vacuo. The semi-solid residue is then refluxed with 150 ml. of ether and 600 ml. of petroleum ether (B.P. 60–70° C.) for thirty minutes. The mixture is cooled to room temperature and the supernatant liquid is decanted. This is evaporated to an oily residue which is taken up with 80 ml. of acetone. Methanolic hydrogen chloride is added to a pH of 3.5, and the resulting precipitate is filtered off after cooling. This precipitate, weighing 2.6 g., constitutes the negatively-rotating epimer of 17-phenylyohimbol. Concentration of the mother liquor to a low volume, yields 3.5 g. of material, which, on paper chromatography (Whatman No. 1, saturated with 10% formamide and 90% of acetone; spiral chromatobox, benzene, heptane, acetone, 1:1:1, in ammonia atmosphere, developed by potassium iodoplatinate) forms a spot near the solvent front, $R_f=.95$. The free base is regenerated by treatment with ammonia followed by extraction with chloroform, and removal of the solvent in vacuo. Recrystallization of this residue twice from methanol gives 1.3 g. of pure 17(p-chlorophenyl)-17-yohimbene as pinkish colored crystals, M.P. 226–235° C., $[\alpha]_D^{25}=-85°$, c.=1.025, l.=1 dm., chloroform; $[\alpha]_D^{25}=-171°$, c.=.580, l.=1 dm., pyridine.

*Analysis.*—Calc. $C_{25}H_{25}N_2Cl$: C, 77.20; H, 6.48; N, 7.20. Found: C, 77.10; H, 6.69; N, 7.11.

EXAMPLE 5

17-(p-Methoxyphenyl)-17-Yohimbene

A solution of 35 g. of yohimbone in 1.8 liters of dry tetrahydrofuran (distilled from $LiAlH_4$) is added with stirring to 500 ml. of 0.8 N ethereal p-anisyl-magnesium bromide over a period of 90 minutes at 0° C. After one hour a solution of 40 g. of ammonium chloride in 300 ml. of water is added and the mixture is stirred for two hours. The two liquid phases are separated and the aqueous phase is extracted with 70 ml. of chloroform. The combined extracts are dried over sodium sulfate and the solution is concentrated to 80 ml. After cooling, the solid is separated by filtration weighing 19.5 g., $[\alpha]_D^{25}=-48°$, c.=0.45, l.=1 dm., 95% methanolic chloroform. The mother liquid is evaporated to dryness and dissolved in 200 ml. of acetone. Ethanolic hydrogen chloride is added to a pH of 4.5 and the crystals, constituting the hydrochloride salt of 17-(p-methoxyphenyl)yohimbol, are recovered by filtration. The resulting mother liquor is concentrated to about 70 ml. and taken up with 200 ml. of ether. Upon cooling 6.5 g. of yellow solid are obtained. To remove the impurities, this solid is refluxed with 50 ml. of acetone and 10 ml. of methanol. Cooling of the mixture yields 4.5 g. of white crystals, $[\alpha]_D^{25}=-98°$, c.=.68, l.=1 dm., 98% aqueous pyridine. These crystals are treated with ammonia in chloroform, the two layers separated, and the chloroform extract dried over sodium sulfate. Evaporation of the solvent in vacuo to dryness and trituration with methanol gives 3.6 g. of pinkish colored crystals, M.P. 217–220° C., $[\alpha]_D^{25}=-106°$, c.=.69, l.=1 dm., chloroform. Recrystallization of this material from acetone-methanol, (1:1), gives pure 17-(p-methoxyphenyl)-17-yohimbene, M.P. 222–228° C., $[\alpha]_D^{25}=-125°$, c.=.755, l.=1 dm., chloroform, $[\alpha]_D^{25}=-168°$, c.=1.25, l.=1 dm., pyridine.

*Analysis.*—Calc. $C_{26}H_{28}N_2O$: C, 81.21; H, 7.34; N, 7.29. Found: C, 80.85; H, 7.52; N, 7.48.

EXAMPLE 6

17-(p-N,N-Dimethylanilyl)-17-Yohimbene

A solution of 25.0 g. of yohimbone in 1.8 liters of dry tetrahydrofuran (distilled over LiAlH₄) is added over 90 minutes to 0.3 mol of an ethereal p-N,N-dimethylanilyl lithium at 0° C. with stirring.

Ionophoresis (700 v./2 ma./100 minutes/5 N. acetic acid) shows complete addition. (Mobility in respect to yohimbone=1.3.) Paper partition chromatography (Whatman No. 1 paper impregnated with 10% of formamide and 90% of acetone, in spiral-chromatobox, heptane, benzene, acetone, 1:1:1, in ammonia atmosphere, developed by potassium iodoplatinate) shows two distinctive spots: one near the solvent front ($R_f=0.95$) and one slightly faster moving than yohimbone ($R_f=0.85$; $R_f$ of yohimbone=0.78). Water (300 ml.) is added to decompose the excess reagent and the complex, and the two layers are separated. The aqueous phase is extracted with two 100 ml. portions of chloroform. The combined extracts are dried over sodium sulfate and the solvent is removed in vacuo. The black-blue semi-solid, upon trituration with 25 ml. of acetonitrile, gives 9.1 g. of tan-colored crystals of 17-(p-N,N-dimethylanilyl)yohimbol, M.P. 248–258° C., $[\alpha]_D^{25}=-61°$, c.=0.45, l.=1 dm., chloroform.

The non-crystallizable mother liquor is passed through a column of acid-washed alumina, using methylene chloride and chloroform as eluents. Of the chromatographic fractions, the first two-thirds contains largely the negatively-rotating epimer of 17-(p-N,N-dimethylanilyl)yohimbol while the last one-third, after evaporation to dryness and recrystallization from methanol, yields 3.4 g. of 17-(p-N,N-dimethylanilyl)-17-yohimbene as pink colored crystals, M.P. 269–280° C.

Recrystallization from methanol after treatment with charcoal yields pure 17-(p-N,N-dimethylanilyl)-17-yohimbene as white-pinkish platelets, M.P. 269–280° C., $[\alpha]_D^{25}=-133°$, c.=.750, l.=1 dm., chloroform; $[\alpha]_D^{25}=-175.6°$, c.=.780, l.=1 dm., pyridine.

*Analysis.*—Calc. $C_{27}H_{31}N_3$: C, 81.57; H, 7.86; N, 10.57. Found: C, 81.33; H, 7.83; N, 10.30.

Infrared absorption spectrum showed the following peaks in reciprocal centimeters: 3245, 1604, 1520, 801. The ultraviolet spectrum showed maxima at 224.3 m$\mu$ ($\epsilon=42,300$) and 282 m$\mu$ ($\epsilon=26,800$) and a minimum at 243 m$\mu$ ($\epsilon=5,510$).

It is understood that the foregoing detailed description is given merely by way of illustration and that many variations may be made therein without departing from the spirit of our invention.

Having described our invention, what we desire to secure by Letters Patent is:

1. A member selected from the group consisting of 17-yohimbenes of the formula:

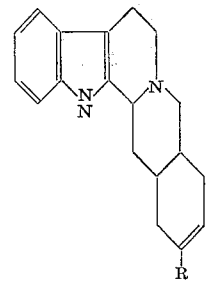

wherein R is a member selected from the group consisting of an alkyl group of the formula $C_nH_{2n+1}$ where $n$ is 1 to 18, an alkenyl group of the formula $C_mH_{2m-1}$ where $m$ is 2 to 18, an alkynyl group of the formula $C_mH_{2m-3}$, an unsubstituted cycloalkyl group having 5 to 7 carbon atoms, naphthyl and radicals of the formula:

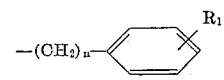

wherein $n$ is 0 to 2 and $R_1$ is a member selected from the group consisting of hydrogen, lower alkyl, lower alkoxy, halogen, phenyl and di-lower alkylamino and the pharmaceutically acceptable non-toxic acid addition and quaternary ammonium salts thereof.

2. 17-phenyl-17-yohimbene.
3. 17-(p-chlorophenyl)-17-yohimbene.
4. 17-(p-methoxyphenyl)-17-yohimbene.
5. 17(p-N,N-dimethylanilyl)-17-yohimbene.

References Cited in the file of this patent

Signaigo et al.: Jour. Amer. Chem. Soc., vol. 55 (1933), pages 3326–3332.

Kimura et al.: Chemical Abstracts, vol. 47 (1953), page 6359.

Campbell et al.: Journ. Chem. Soc. (London), (1954), pages 2154–2155.

Theilheimer: Synthetic Methods, vol. 10 (1956), page 535.

Fieser et al.: Organic Chemistry, Reinhold, New York (1956), page 56.

Migrdichian: Organic Synthesis, Reinhold, New York, N.Y. (1957), pages 835–837.

Noller: Chemistry of Organic Compounds, Saunders, Philadelphia (1957), pages 104–105.